United States Patent
Giles

(10) Patent No.: US 6,880,072 B1
(45) Date of Patent: Apr. 12, 2005

(54) PIPELINED PROCESSOR AND METHOD USING A PROFILE REGISTER STORING THE RETURN FROM EXCEPTION ADDRESS OF AN EXECUTED INSTRUCTION SUPPLIED BY AN EXCEPTION PROGRAM COUNTER CHAIN FOR CODE PROFILING

(75) Inventor: Christopher M. Giles, Lafayette, CO (US)

(73) Assignee: LSI Logic Corporation, Milpitas, CA (US)

( * ) Notice: Subject to any disclaimer, the term of this patent is extended or adjusted under 35 U.S.C. 154(b) by 611 days.

(21) Appl. No.: 09/850,865

(22) Filed: May 8, 2001

(51) Int. Cl.[7] .............................................. G06F 9/00
(52) U.S. Cl. ..................... 712/244; 712/227; 714/47; 717/158
(58) Field of Search ................ 712/227, 244; 714/47; 717/158

(56) References Cited

U.S. PATENT DOCUMENTS

| | | | | |
|---|---|---|---|---|
| 5,355,487 A | * | 10/1994 | Keller et al. | 717/127 |
| 5,742,780 A | * | 4/1998 | Caulk, Jr. | 712/206 |
| 5,949,971 A | * | 9/1999 | Levine et al. | 714/47 |
| 6,112,317 A | * | 8/2000 | Berc et al. | 714/47 |
| 6,275,929 B1 | * | 8/2001 | Blum et al. | 712/219 |

OTHER PUBLICATIONS

James Larus, "Basic Block Profiling Isn't Always Accurate", http://compilers.iecc.com/comparch/article/93-03-024, Mar. 8th, 1993.*

* cited by examiner

*Primary Examiner*—Richard L. Ellis
*Assistant Examiner*—Aimee J. Li
(74) *Attorney, Agent, or Firm*—L. Jon Lindsay

(57) ABSTRACT

A pipeline processor having an exception program counter chain generates a return address in the exception program counter chain for an executing instruction. The return address is the point at which instruction execution should resume after an exception handler routine runs if the executing instruction incurs an exception. The return address is stored into a profiling register if and when the corresponding instruction completes execution. The profiling register is periodically sampled and a statistical profile is built of instructions executed in the processor by using the return addresses sampled. A sampled return address is identified as a branch delay instruction and included in the statistical profile if the sampled return address is that of a branch instruction which immediately precedes a branch delay instruction.

3 Claims, 5 Drawing Sheets

FIG._1

PIPELINED PROCESSOR AND METHOD USING A PROFILE REGISTER STORING THE RETURN FROM EXCEPTION ADDRESS OF AN EXECUTED INSTRUCTION SUPPLIED BY AN EXCEPTION PROGRAM COUNTER CHAIN FOR CODE PROFILING

FIELD OF THE INVENTION

This invention relates to executing instructions in a pipelined processor of a computer system. More particularly, the present invention relates to a new and improved method of code profiling using a code profiling register with an existing exception program counter chain to perform hardware code profiling without duplicating the program counter for each stage in the pipeline.

BACKGROUND OF THE INVENTION

Code profiling involves sampling instructions of a target computer program executed in a processor, and building a statistical profile for the instructions. The statistical profile typically indicates which program instructions of the target computer program have executed and the frequency of execution for those instructions. A programmer analyzes the statistical profile to determine whether certain program instructions have executed, which portions of code executed most frequently, and where bottlenecks are present in the execution of the target computer program. The portions of the target computer program that are executed most frequently are then typically optimized to improve the overall execution time of the target computer program.

The instructions are typically sampled by reading the addresses of the instructions as they are in the process of execution. In one method of code profiling, a program counter is sampled to read the address of an instruction as the instruction is fetched from a memory. A count of each sampled address is kept and updated while the target computer program executes. The sampled addresses are associated with instructions in memory and a statistical profile is then built for the instructions by using the counts of the sampled instructions.

The statistical profile built by sampling the program counter for fetched instructions may not accurately reflect the instructions executed on the processor because some instructions that are fetched from memory do not complete execution in the processor. For example, instructions executed in pipelined processors may not complete execution because of exceptions, branches, and execution mispredictions that occur during execution of the target computer program. If instructions are sampled while being fetched from memory but do not complete execution, the count and statistical profile will not accurately reflect the instructions actually executed by the processor. Instructions should only be sampled after they actually execute, but an instruction in a pipelined processor may terminate without actually executing as late as a last stage of the instruction pipeline. Only instructions that have successfully passed through all instruction pipeline stages should be placed into a profiling register where they can be sampled to build the statistical profile.

In another method of code profiling, a chain of program counters is formed by duplicating the program counter for each stage of the instruction pipeline. The chain of program counters is a shift register that is synchronized with the instruction pipeline stages. The program counter chain maintains the address of the instruction as the instruction executes in the instruction pipeline stages. The addresses of instructions shift through the program counters as instructions move through instruction pipeline stages during execution of the instructions. The last program counter in the chain is sampled, or copied into a hardware profiling register and sampled, only after the instruction in the last stage of the instruction pipeline has completed execution. The resulting statistical profile more accurately reflects the instructions executed than a statistical profiled formed by a method that samples addresses from the program counter while instructions are fetched from the memory.

The addition of a program counter chain to a pipelined processor consumes area in the processor and may impact performance of the processor. In larger pipelined processors having instruction execution prediction resources and high clock rates, the area consumed and performance cost is unacceptable. Additionally, the function of the program counter chain is complex and prone to bugs because many execution slots in the instruction pipeline may not have active instructions or the location of an instruction may slide in the instruction pipeline while the rest of the instruction pipeline is stalled. In particular, the addition of the program counter chain may impact the operating frequency of the processor.

It is with respect to these and other considerations that have given rise to the present invention.

SUMMARY OF THE INVENTION

One aspect of the present invention relates to a method of code profiling in a pipelined processor using an exception program counter chain and a profiling register. Other aspects of the invention relate to avoiding the addition of a program counter chain to perform hardware code profiling, thereby saving design time, complexity and area, and preserving the operating frequency of the pipelined processor. Mother aspect of the invention relates to obtaining a more accurate statistical code profile than is obtainable by sampling the program counter as instructions are fetched from memory.

In accordance with these and other aspects, the invention relates to a pipelined processor having an exception program counter chain that generates return addresses for corresponding instructions executing in the pipelined processor, and a profiling register which receives and stores return addresses generated by an exception program counter chain when corresponding instructions are executed in the pipelined processor. The return addresses allow instruction execution to resume at a proper point after an instruction incurs an exception and returns from an exception handler routine. The profiling register is periodically sampled, obtaining the return address stored in the profiling register, and a statistical profile of the instructions executed in the pipelined processor is built by using the return addresses sampled from the profiling register.

Other preferred aspects of the pipelined processor include storing the address of the last instruction that executed in the pipelined processor into the profiling register. Another preferred aspect includes storing the address of the instruction that last executed in the pipelined processor into the profiling register where the instruction that last executed is not a branch delay instruction, and storing the address of the branch instruction that last executed into the profiling register where the instruction that last executed in the pipelined processor is a branch delay instruction.

In accordance with these and other aspects, the invention also relates to a method of profiling instructions executing in a pipelined processor that generates a return address for each instruction executing in the pipeline. The return address is the point at which instruction execution should resume after an exception handler routine runs, if the executing instruction incurs an exception. The return addresses are periodically sampled and a statistical profile is built for the instructions executed in the pipelined processor by using the return addresses sampled.

Other preferred aspects of the method include storing the return address into a profiling register and sampling the profiling register by reading the return address stored in the profiling register. Another preferred aspect of the method includes sampling the profiling register and reading the address of the last instruction that executed in the pipelined processor. Another preferred aspect includes sampling the profiling register and reading the address of the instruction that last executed in the pipelined processor where the instruction that last executed is not a branch delay instruction, and sampling the address of the address of the branch instruction that last executed in the pipelined processor where the instruction that last executed in the pipelined processor is a branch delay instruction. Another preferred aspect includes calculating a count for each return address instruction sampled, creating a count for branch delay instructions, and allocating a portion of the count for branch instructions to the count for branch delay instructions.

A more complete appreciation of the present invention and its improvements can be obtained by reference to the accompanying drawings, which are briefly summarized below, by reference to the following detailed description of a presently preferred embodiment of the invention, and by reference to the appended claims.

DETAILED DESCRIPTION

Figure 1:
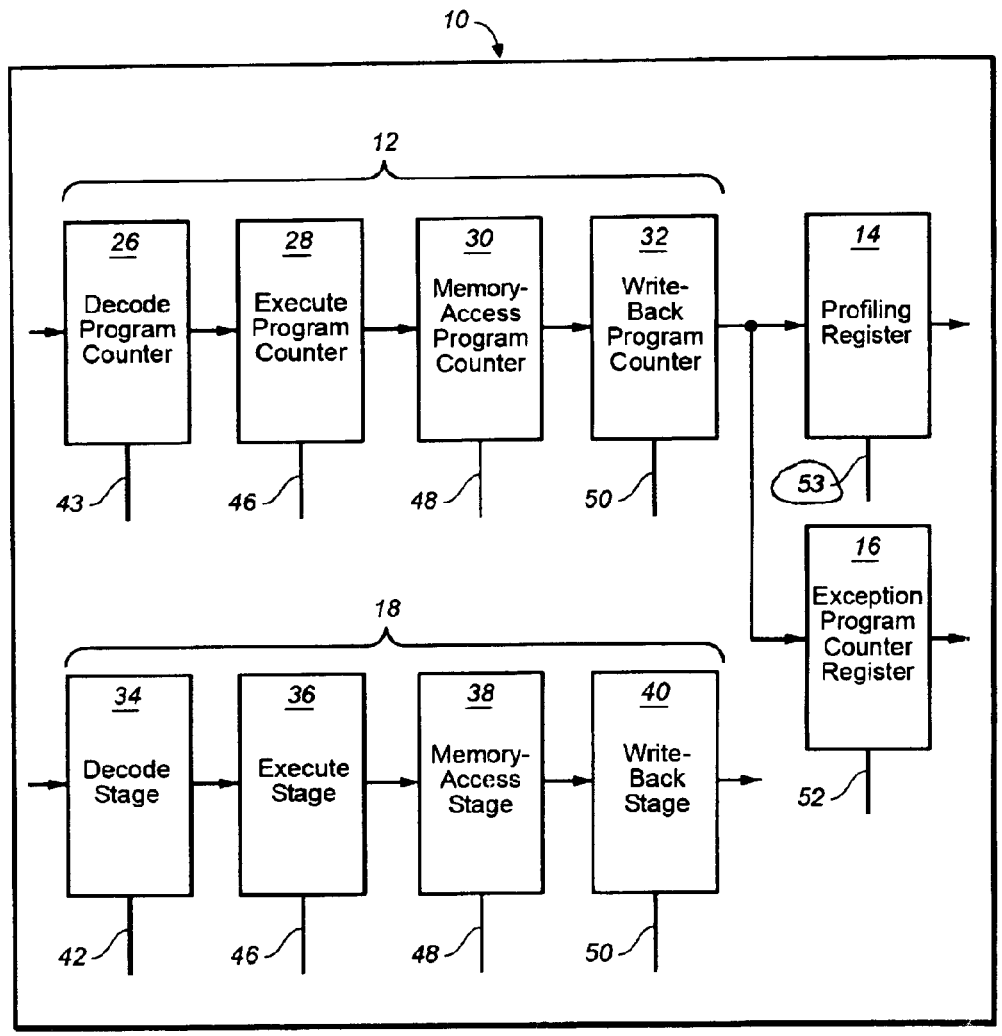
FIG. 1 is a block diagram of a pipelined processor incorporating the present invention and by which a method of the present invention may be practiced.

A portion of a pipelined processor 10 incorporating the present invention and in which a method of the present invention may be used is shown in FIG. 1. The pipelined processor 10 includes an exception program counter chain 12, a profiling register 14, an exception program counter 16, and an instruction pipeline 18. The exception program counter chain 12 contains addresses 20 of instructions 22 (FIG. 2) which are in the process of execution in the instruction pipeline 18. The instruction addresses 20 (FIG. 2) move through program counters 26, 28, 30 and 32 of the exception program chain 12 as corresponding instructions 22 (FIG. 2) move through stages 34, 36, 38 and 40 of the instruction pipeline 18 while they are being executed.

The exception program counter 16 holds a return address at which execution should resume after an instruction 22 (FIG. 2) incurs an exception during execution in the instruction pipeline 18. The exception program counter 16 receives the return address from the last program counter 32 of the exception program counter chain 12 when the instruction in the last stage 40 of the instruction pipeline 18 incurs an exception. In pipelined processors 10 with branch delay slots, in which one or more branch delay instructions can be executed before a target instruction of a branch instruction is executed, the exception program counter 16 may not contain the address of the branch delay instruction that incurs an exception. Instead, the exception program counter 16 may contain the address of the preceding branch instruction at which execution should resume after the exception is handled. The profiling register 14 receives the return address from the last program counter 32 of the exception program counter chain 12 when the instruction in the last stage 40 of the instruction pipeline has completed execution. The instruction address in the profiling register 14 is then periodically sampled by reading the profiling register 14, and a statistical profile is built from the sampled instructions.

More details of the exception program counter chain 12 are shown in FIGS. 1 and 3–7. The exception program counter chain 12 includes four program counters 26, 28, 30 and 32 which are synchronized with, and correspond respectively to, stages 34, 36, 38 and 40 of the instruction pipeline 18. The instructions 22 (FIG. 2) are clocked through the stages 34–40 of the instruction pipeline 18 while corresponding instruction addresses 20 (FIG. 2) are clocked through program counters 26–32 of the exception program counter chain 12.

Figure 2:
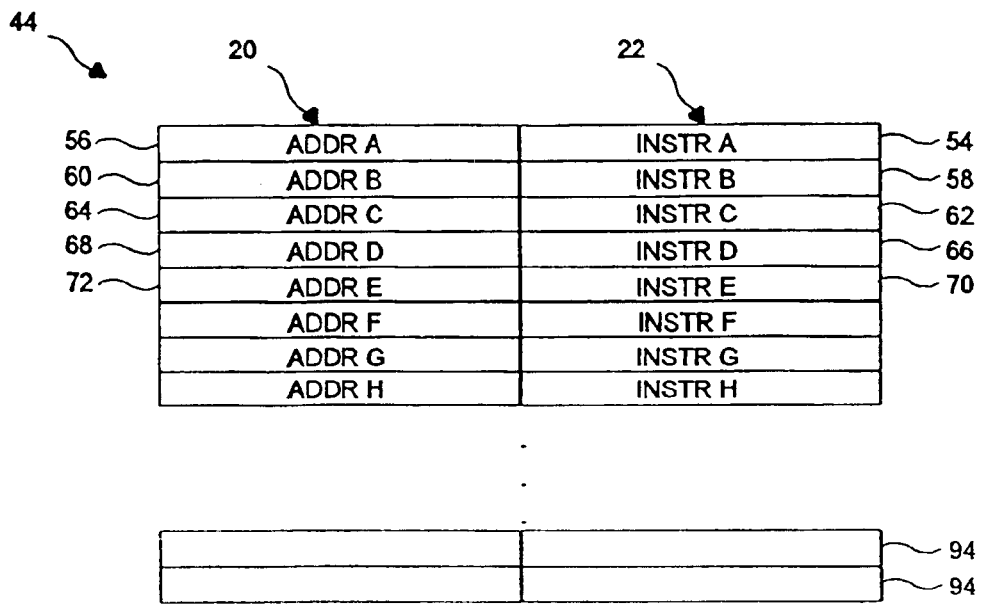
FIG. 2 is a bock diagram of a memory used with the pipelined processor shown in FIG. 1.
Figure 3:
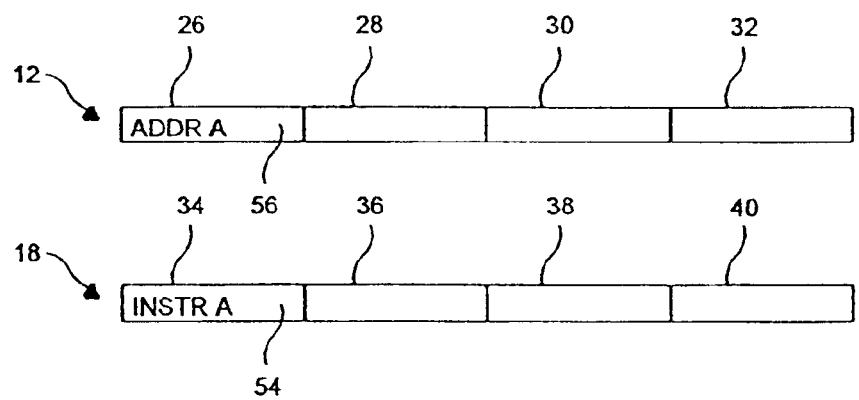
FIGS. 3–7 are illustrations of an exception program counter chain and an instruction pipeline shown in FIG. 1.

Typical operation of the pipelined processor 10 is shown in FIGS. 2–7. A branch instruction 54 is fetched from memory 44 (FIG. 2) and a decode stage clock signal 42 (FIG. 1) clocks the branch instruction 54 into the decode stage 34 while a decode program counter clock signal 43 (FIG. 1) clocks the corresponding branch instruction address 56 into the decode program counter 26 as shown in FIG. 3. The decode program counter clock signal 43 (FIG. 1) has the same functionality and characteristics as the decode stage dock signal 42 (FIG. 1), except that the decode program counter clock signal 43 (FIG. 1) is inhibited when a branch delay instruction 58 is fetched from memory 44 (FIG. 2) and clocked into the decode stage 34 by the decode stage clock signal 42 (FIG. 1). Accordingly, the address stored in the decode program counter 26 does not change when the decode stage clock signal 42 (FIG. 1) clocks a branch delay instruction into the decode stage 34.

Figure 4:
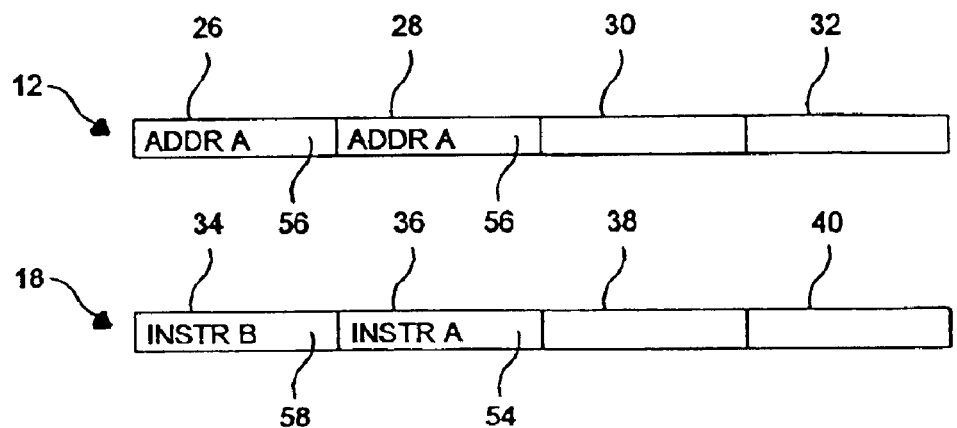

An execute stage clock signal 46 (FIG. 1) clocks branch instruction 54, supplied by the decode stage 34, into the execute stage 36 while clocking the corresponding branch instruction address 56, supplied by the decode program counter 26, into the execute program counter 28, all as shown in FIG. 4. Branch delay instruction 58 is simultaneously or thereafter fetched from memory 44 (FIG. 2) and is clocked into the decode stage 34. The address 60 (FIG. 2) of the branch delay instruction 58 is not clocked into the decode program counter 26, but rather the address 56 of the branch instruction 54 remains in the decode program counter 26 when the branch delay instruction 58 is clocked into the decode stage 34. The branch instruction address 56 in the execute program counter 28 is the return address for the branch instruction 54 in the execute stage 36, and the branch instruction address 56 in the decode program counter 26 is the return address for the branch delay instruction 58 in the decode stage 34.

Figure 5:
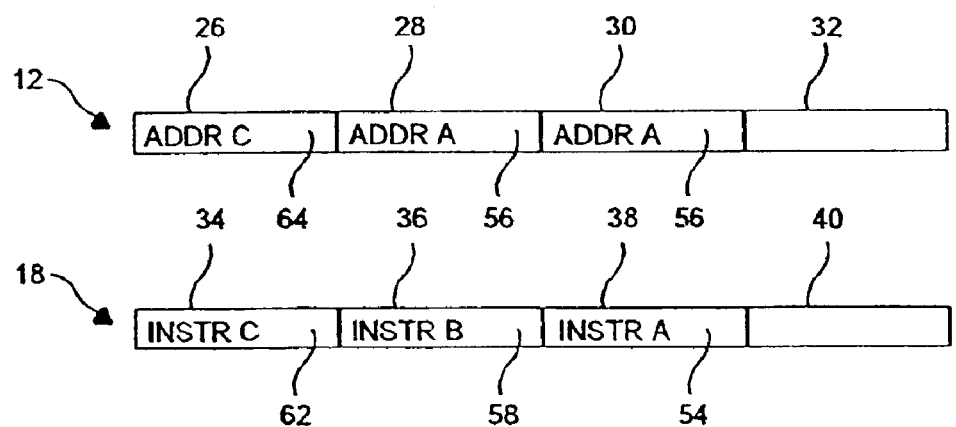

A memory-access stage clock signal 48 (FIG. 1) clocks the branch instruction 54 supplied by the execute stage 36 into the memory-access stage 38 while clocking the corresponding branch instruction address 56, supplied by the execute program counter 28, into the memory-access program counter 30, as shown in FIG. 5. The execute stage clock signal 46 (FIG. 1) simultaneously or thereafter clocks the branch delay instruction 58, supplied by the decode stage 34, into the execute stage 36 and clocks branch instruction address 56, supplied by the decode program counter 26, into the execute program counter 28. Instruction 62 is simultaneously or thereafter fetched from memory 44 (FIG. 2) and is clocked into the decode stage 34 while an address 64 of instruction 62 is clocked into the decode program counter 26 by the decode program counter clock signal 43 (FIG. 1), as shown in FIG. 5.

Figure 6:
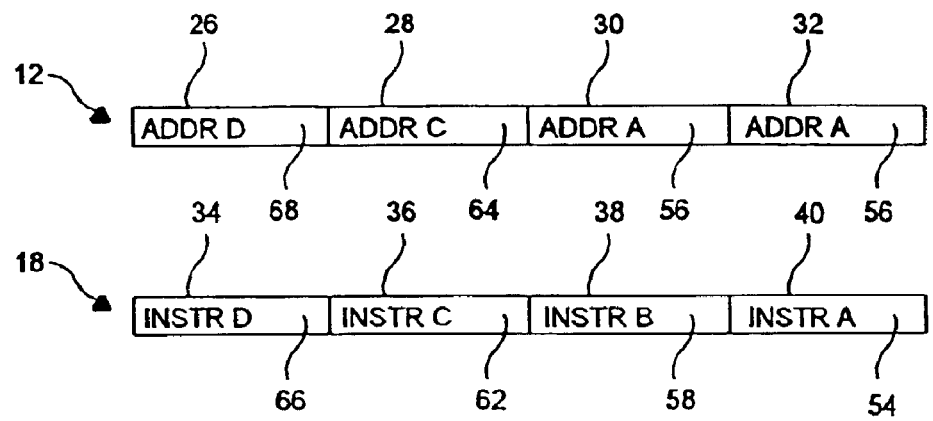

A write-back stage clock signal 50 (FIG. 1) clocks branch instruction 54, supplied by the memory-access stage 38, into the write-back stage 40 while clocking the corresponding instruction address 56, supplied by the memory-access program counter 30, into the write-back program counter 32, as shown in FIG. 6. The memory-access stage clock signal 48 (FIG. 1) simultaneously or thereafter clocks branch delay instruction 58, supplied by the execute stage 36, into the memory-access stage 38 and clocks address 56 of the branch instruction 54, supplied by the execute program counter 28, into the memory-access program counter 30. The execute stage clock signal 46 (FIG. 1) simultaneously or thereafter clocks instruction 62, supplied by the decode stage 34, into the execute stage 36 and clocks instruction address 64, supplied by the decode program counter 26, into the execute program counter 28. Instruction 66 is simultaneously or thereafter fetched from memory 44 (FIG. 2) and is clocked into the decode stage 34 while an address 68 of instruction 66 is clocked into the decode program counter 26 by the decode program counter clock signal 43 (FIG. 1).

Figure 7:
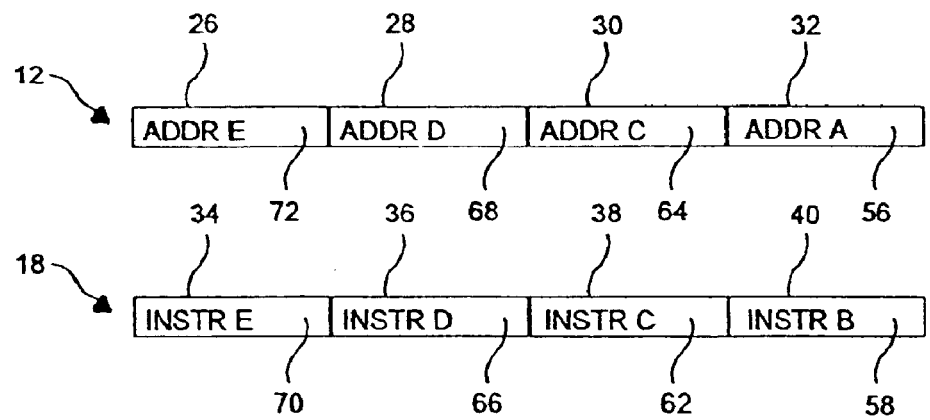

The instruction addresses 56, 64 and 68 fill the exception program counter chain 12 and instructions 54, 58, 62 and 66, which are in various stages of execution, fill the instruction pipeline 18, as shown in FIG. 6. Branch instruction 54 in the write-back stage 40 of the instruction pipeline 18 will either complete execution, incur an exception, or be killed. In any case, the branch instruction 54 in the write-back stage 40 is subsequently overwritten when the write-back clock signal 50 (FIG. 1) clocks branch delay instruction 58, supplied by the memory-access stage 38, into the write-back stage 40 while clocking the branch delay instruction address 56, supplied by the memory-access program counter 30, into the write-back program counter 32, as shown in FIG. 7. The memory-access stage clock signal 48 (FIG. 1) simultaneously or thereafter clocks instruction 62, supplied by the execute stage 36, into the memory-access stage 38 and clocks instruction address 64, supplied by the execute program counter 28, into the memory-access program counter 30. The execute stage clock signal 46 (FIG. 1) simultaneously or thereafter clocks instruction 66, supplied by the decode stage 34, into the execute stage 36 and clocks instruction address 68, supplied by the decode program counter 26, into the execute program counter 28. Instruction 70 is simultaneously or thereafter fetched from memory 44 (FIG. 2) and is clocked into the decode stage 34 while an address 72 of instruction 70 is clocked into the decode program counter 26 by the decode program counter clock 43 (FIG. 1).

If the branch instruction 54 completes execution in the write-back stage 40, the corresponding branch instruction address 56 in the write-back program counter 32 is clocked into the profiling register 14 by a profiling register clock signal 53 (FIG. 1). If the branch instruction 54 incurs an exception in the write-back stage 40, the branch instruction address 56 is clocked into the exception program counter 16 by an exception program counter clock signal 52 (FIG. 1). If the branch instruction 54 is killed and removed from the write-back stage 40, the branch instruction address 56 is not clocked into either the profiling register 14 or the exception program counter 16 (FIG. 1). A write-back stage clock signal 50 (FIG. 1) clocks the branch delay instruction 58, supplied by the memory-access stage 38, into the write-back stage 40 while clocking the branch instruction address 56, supplied by the memory-access program counter 30, into the write-back program counter 32 as shown in FIG. 7. The memory-access stage clock signal 48 (FIG. 1) simultaneously or thereafter clocks instruction 62, supplied by the execute stage 36, into the memory-access stage 38 while clocking corresponding instruction address 64, supplied by the execute program counter 28, into the memory-access program counter 30. The execute stage clock signal 46 (FIG. 1) simultaneously or thereafter clocks instruction 66, supplied by the decode stage 34, into the execute stage 36 while clocking corresponding instruction address 68 supplied by the decode program counter 26 into the execute program counter 28. Instruction 70 is simultaneously or thereafter fetched from memory 44 (FIG. 2) and is clocked into the decode stage 34 while an address 72 of instruction 70 is clocked into the decode program counter 26 by the decode program counter clock signal 43 (FIG. 1). The instruction addresses 56, 64, 68 and 72 fill the exception program counter chain 12 and instructions 58, 62, 66 and 70, which are in various stages of execution, fill the instruction pipeline 18, as shown in FIG. 7.

If the branch delay instruction 58 incurs an exception in the write-back stage 40, the branch instruction address 56 in the write-back program counter 32 is clocked into the exception program counter 16 by the exception program counter clock signal 52 (FIG. 1). If the branch delay instruction 58 completes execution in the write-back stage 40, the branch instruction address 56 in the write-back program counter 32 is clocked into the profiling register 14 by the profiling clock signal 53 (FIG. 1) before the write-back clock signal 50 clocks the next instruction address supplied by the memory-access program counter 30 into the write-back program counter 32. When the branch delay instruction 58 completes execution or incurs an exception, the address 56 of the immediately preceding branch instruction 54 (FIGS. 2 and 6) is clocked into the profiling register 14 or the exception program counter register 16, respectively, rather than the instruction address 60 (FIG. 2) of the branch delay instruction 58, because the branch instruction address 56 of the immediately preceding branch instruction 54 (FIG. 6) is the point at which instruction execution should resume after the branch delay instruction 58 incurs an exception. However, the branch delay instruction 58 may be included in the statistical profile if the preceding branch instruction 54 has been sampled. Preferably, a profiling computer program is modified to consider and include the branch delay instruction 58 that is executed immediately after the branch instruction 54 when the branch instruction 54 has been sampled.

Figure 8:
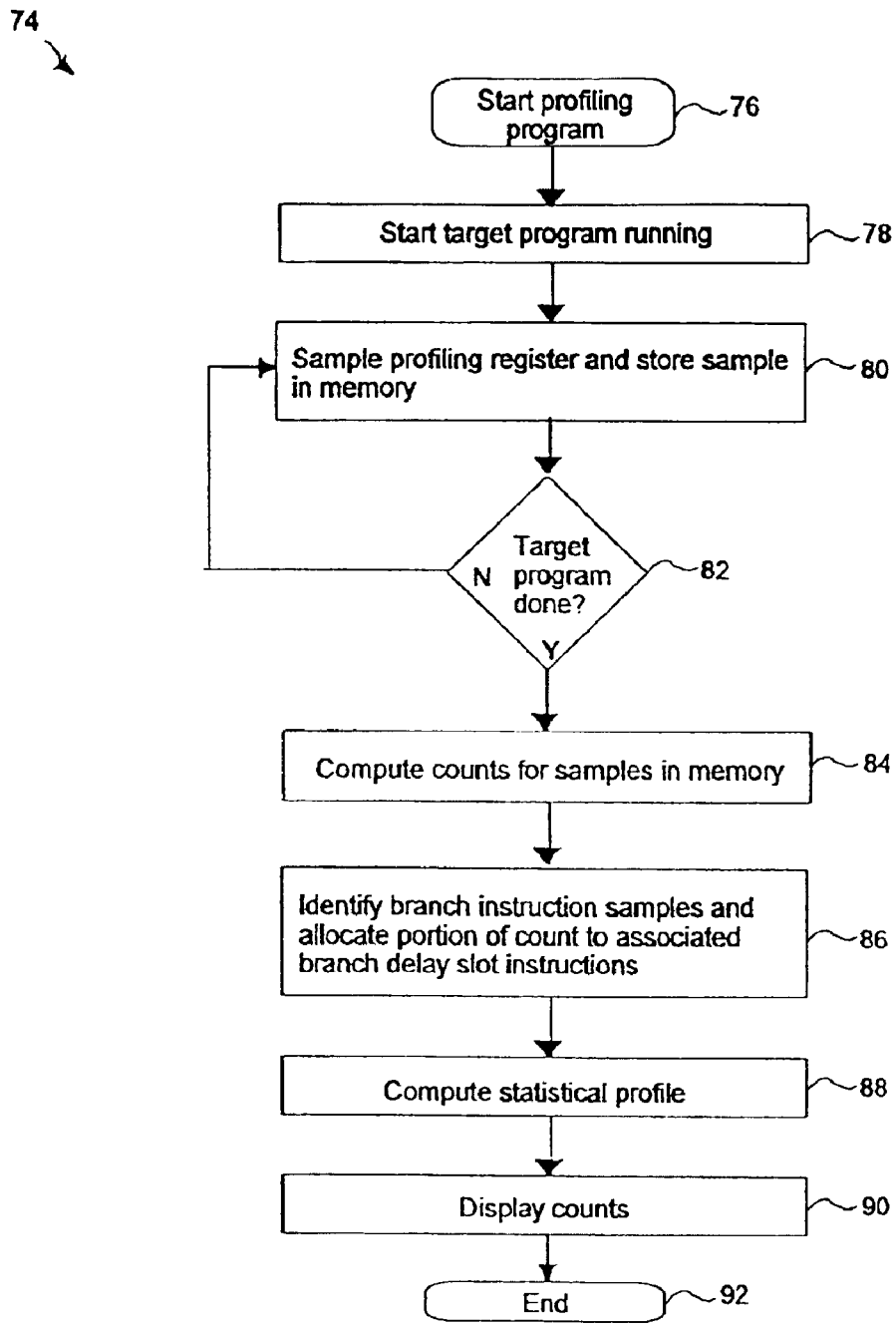
FIG. 8 is a flow chart diagram of a profiling computer program used in the pipelined processor shown in FIG. 1 and of a method of the present invention.

A flow chart 74 of a profiling computer program incorporating the method of the present invention is shown in FIG. 8. The profiling computer program begins execution at step 76 and a target computer program begins execution at step 78. The target computer program executes in the pipelined processor 10 (FIG. 1) while instructions 22 (FIG. 2) of the target program execute in the instruction pipeline 18 (FIG. 2). The corresponding return address in the exception program counter chain 12 (FIG. 1) for each instruction 22 (FIG. 1) executed in the instruction pipeline 18 (FIG. 2) is stored in the profiling register 14 (FIG. 1) after each instruction 22 (FIG. 1) executes. The profiling register 14 (FIG. 1) is sampled by reading the return address stored in the profiling register 14, and the sample is stored in an unoccupied location 94 of memory 44 (FIG. 2) at step 80. The target computer program is checked to determine if the target program has terminated execution at step 82. If the target program has not terminated execution, the profiling computer program loops back to step 80, reads a new sample from the profiling register 14 (FIG. 1), and stores the new sample in another unoccupied location 94 in memory 44 (FIG. 2) at step 80. Preferably, each return address stored in the profiling register 14 is sampled as the profiling computer program loops around steps 80 and 82.

If the target program has terminated execution at step 82, a count is computed for the samples stored in memory 44 (FIG. 2) at step 84. At step 86, the samples are then examined to identify any samples that are branch instruction addresses that precede branch delay instructions in the target computer program. The samples are identified as branch instructions by using a conventional method used to identify instructions from instruction addresses. For example, a branch instruction may be identified by fetching the instruction 22 from memory 44 (FIG. 2) at the sample address, and identifying the instruction 22 by using the binary representation of the instruction 22.

Counts for the identified branch delay instructions are formed by allocating a portion of the count for each identified branch instruction to the associated branch delay instructions that immediately follow the identified branch instruction in memory 44 (FIG. 2). The count of the identified branch instruction is decreased by the amount of the portion allocated to the associated branch delay instructions. For example, the branch instruction count may be evenly divided between the branch instruction count and an associated branch delay instruction count. The count may also be divided between the branch instruction count and the associated branch delay instruction count in proportion to the typical execution times of the branch instruction and branch delay instruction. The aforementioned methods of allocating a count to the branch delay instructions are only examples, and any conventional method of allocating counts to instructions in a profiling program may be used.

The statistical profile is computed at step 88. The statistical profile is computed using methods conventionally used to calculate statistics in an instruction profiling program. For example, the number of times that a particular instruction, function or subprogram executes may be computed. The statistical profile is displayed at step 90 and the profiling computer program then terminates at step 92.

The exception program counter chain 12 is used with the profiling register 14 to obtain addresses of instructions that have executed in the instruction pipeline 18. The profiling register 14 is periodically sampled to build a statistical profile of the instructions that have executed. Although the profiling register 14 contains the address 56 of the preceding branch instruction 54 when the branch delay instruction 58 executes, the execution of the branch delay instruction 58 can be inferred from sampling the profiling register 14 when the profiling register 14 contains the address 56 of the immediately preceding branch instruction 54. The branch delay instruction 58 is then included in the statistical profile. The addition of the profiling register 14 to the pipelined processor having an exception program counter chain 12 avoids the need for adding duplicate program counters synchronized with stages 34–40 of the instruction pipeline 18 in order to perform hardware code profiling. The addition of a single profiling register 14 saves design time, complexity and area, and preserves the operating frequency of the pipelined processor 10. Many other advantages and improvements will be apparent after gaining an understanding of the present invention.

The presently preferred embodiment of the present invention have been shown and described with a degree of particularity. These descriptions are of a preferred example of the invention. In distinction to its preferred example, it should be understood that the scope of the present invention is defined by the scope of the following claims, which should not necessarily be limited to the detailed description of the preferred embodiment set forth above.

The invention claimed is:

1. A method of profiling instructions executing in a pipelined processor, the pipelined processor generating a return address for each executing instruction for resuming instruction execution if the instruction incurs an exception, the method including the steps of:

periodically sampling the return address generated by the pipelined processor;

building a statistical profile of the instructions executed in the processor by using the return addresses sampled;

calculating a count for each return address sampled;

analyzing each return address to determine if each return address is a branch instruction address; and creating a count for branch delay instructions by allocating a portion of the count for each return address of a branch instruction to the count for the branch delay instructions.

2. A method as defined in claim 1, further including the step of:

allocating the count of a branch instruction substantially evenly between the branch instruction and an immediately following branch delay instruction.

3. A method as defined in claim 1, further including the step of:

allocating the count of a branch instruction between the branch instruction and an immediately following branch delay instructions in proportion to the execution time of the branch instruction in relation to the execution time of the branch delay instructions.

* * * * *